United States Patent
de Montebello

[15] 3,706,486
[45] Dec. 19, 1972

[54] REINFORCED LENTICULAR SHEET WITH PLURAL APERTURED SHEETS

[72] Inventor: Roger de Montebello, 20 Chapel Street, Brookline, Mass. 02146

[22] Filed: Aug. 27, 1970

[21] Appl. No.: 67,636

Related U.S. Application Data

[62] Division of Ser. No. 674,556, Oct. 11, 1967, Pat. No. 3,584,369.

[52] U.S. Cl. .................. 350/167, 350/206, 350/207
[51] Int. Cl. ................................. G02b 27/00
[58] Field of Search......350/167, 178, 205, 206, 207, 350/127, 128; 95/18 P; 355/34

[56] References Cited

UNITED STATES PATENTS

| | | | |
|---|---|---|---|
| 2,261,442 | 11/1941 | Martin | 350/128 |
| 3,114,979 | 12/1963 | Fox | 350/167 X |
| 3,178,993 | 4/1965 | Ferris et al. | 350/167 |
| 2,292,152 | 8/1942 | Newcomer | 350/167 UX |
| 3,347,651 | 10/1967 | Lueck | 350/178 X |

*Primary Examiner*—John K. Corbin
*Attorney*—Barnard, McGlynn & Reising

[57] ABSTRACT

A process of forming a lenticular sheet for use in integral photography having an intermediate apertured metal sheet which acts as a reinforcing member and/or as a diaphragm and/or as a field-limiting member, the apertures being coaxial with the lenslets of the lenticular sheet in which they are embedded or with which the sheet is associated. Preferably, the diaphragm layer is a thin apertured metal layer bonded on a second thicker metal layer, in certain instances, the thin layer being provided with diaphragm apertures at the principal points of the lenslets while the thicker layer has larger apertures, which serve as clearance apertures. In certain instances a second metal sheet similar to the first sheet may be provided with the apertures serving as field-limiting apertures, in which case they are preferably hexagonal. The reinforced lenticular sheets according to the present invention may be used for taking the original photographs in integral photography, for converting the pseudoscopic image of a hologram, or of an integral photograph into an autostereoscopic integral photograph, and also in certain instances for viewing integral photographs.

3 Claims, 10 Drawing Figures

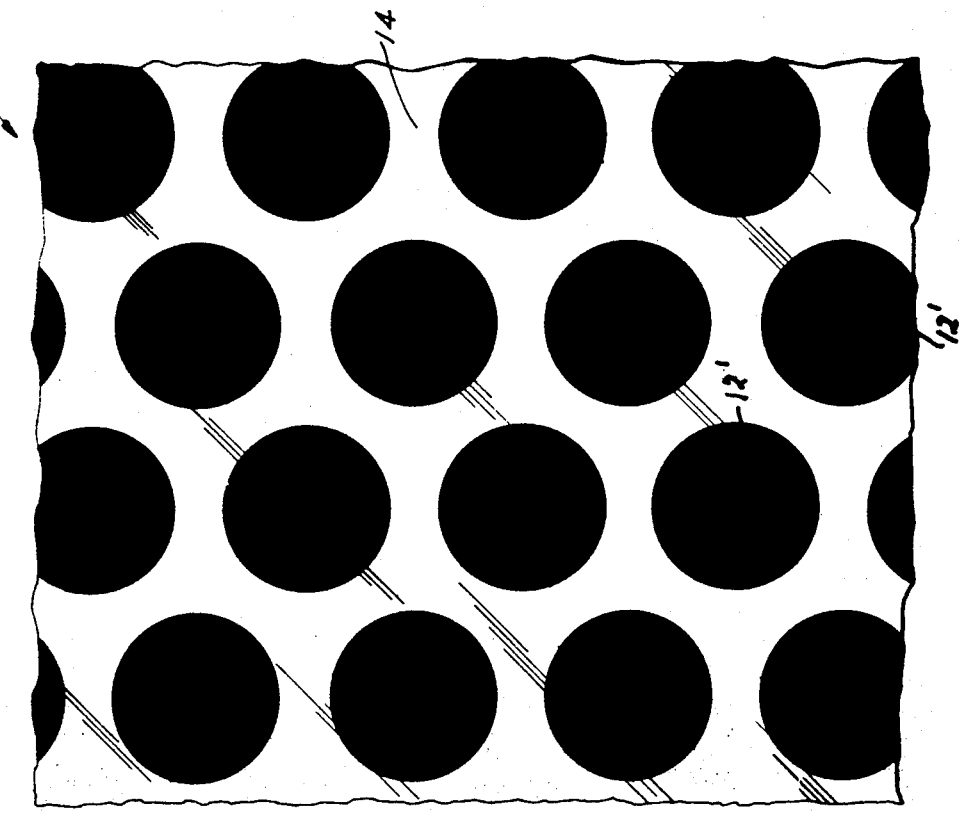
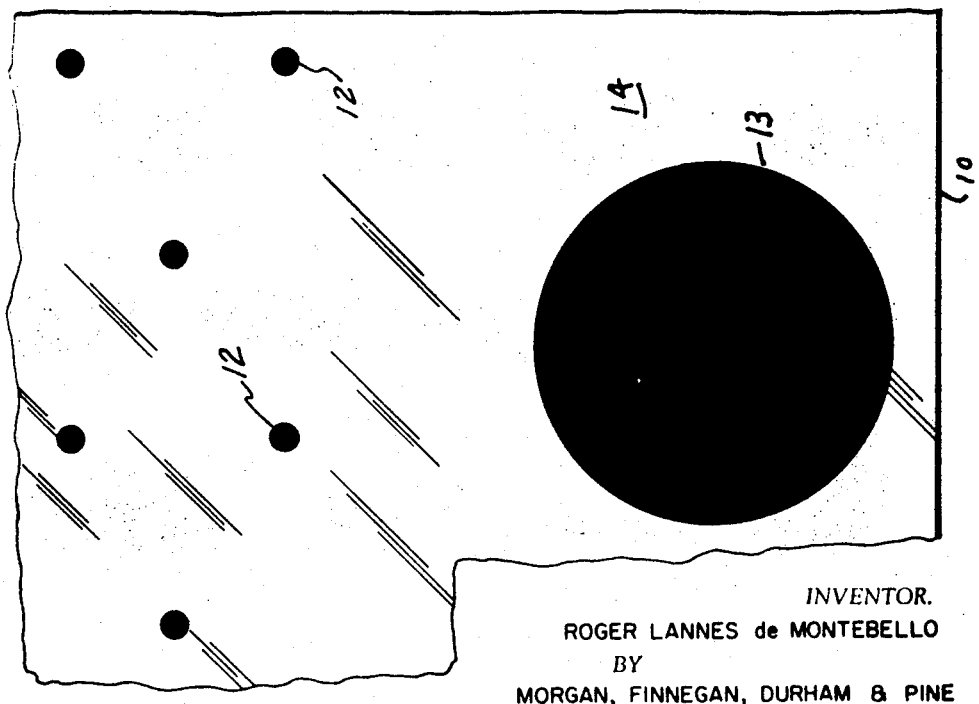

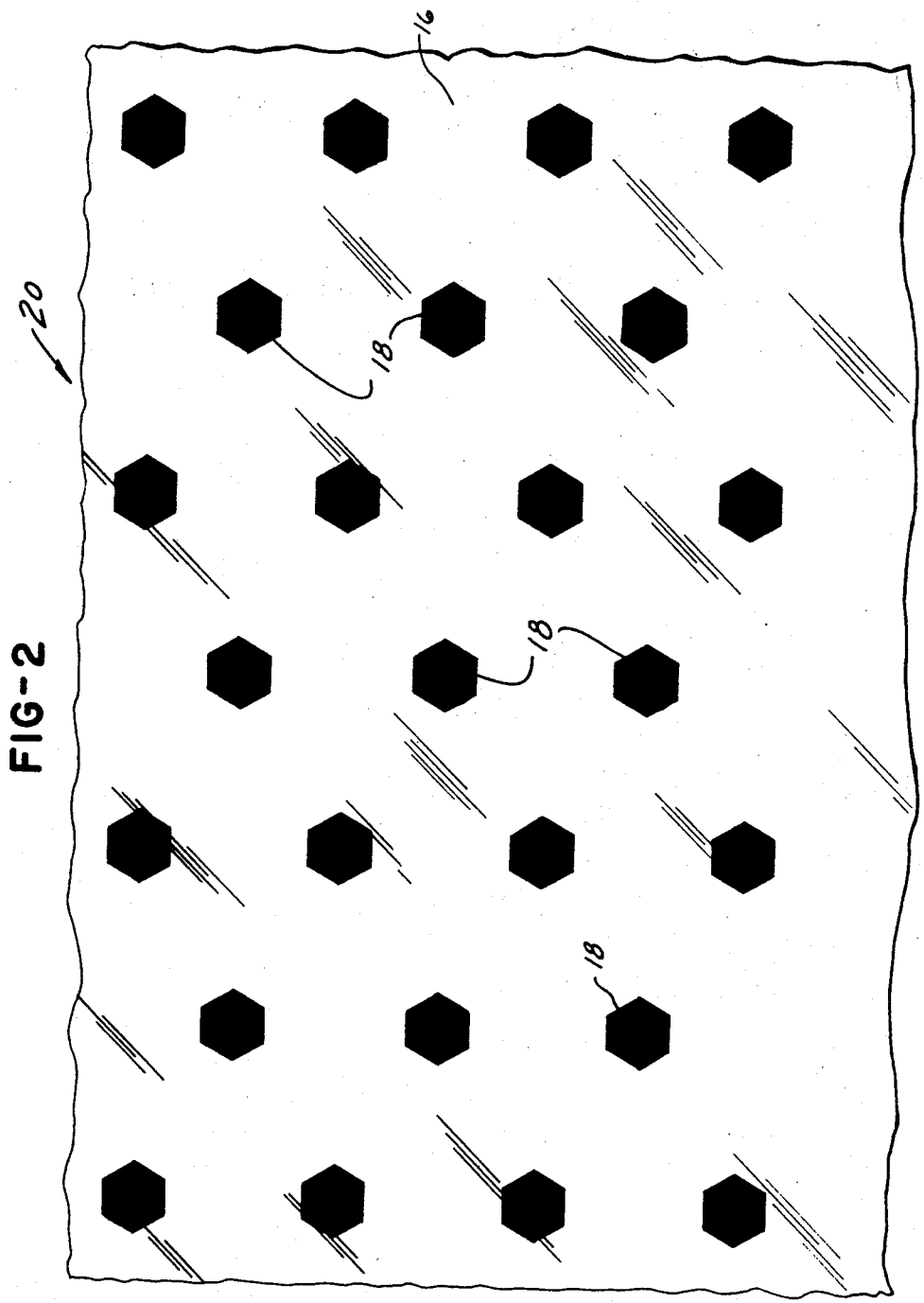

3,706,486

REINFORCED LENTICULAR SHEET WITH PLURAL APERTURED SHEETS

CROSS REFERENCE TO RELATED APPLICATIONS

This application is a divisional of our co-pending application, Ser. No. 674,556, filed Oct. 11, 1967, now U.S. Pat. No. 3,584,369.

The present invention is especially adapted for the formation of lenticular sheets which are useful in connection with the practice of integral photography according to the method of my copending application, Ser. No. 600,957, filed Dec. 12, 1966, now U.S. Pat. No. 3,503,315 although the lenticular sheets have many other applications.

BACKGROUND OF THE INVENTION

Field of the Invention

Many processes of integral photography involve the use of lenticular sheets comprising a closely packed array of lenslets, either in square array, or more preferably in hexagonal array, to focus their several images on a sensitive element, or to allow the processed photographic element to be viewed by an observer. The images formed by the lenticular sheet on the sensitive element are greatly improved by the provision of a diaphragm aperture sheet in the principal plane of the lenslets, the lenslets being accurately concentric with the apertures in the diaphragm sheet. The integral photograph is further improved by the provision of field-limiting masks which prevent the image formed by one lenslet from exposing the sensitive layer used to record the image from an adjacent lenslet. Similarly, for certain wide angle configurations, in viewing the photographic record of an integral photograph the observer does not view adjacent images through any lens except the single appropriate overlying lenslet. The apertured metal sheets also serve to reinforce the lenticular sheets in which they are embedded, especially in preventing lateral shrinkage of the lenticular sheet where the sheets are made of transparent plastic and have an inherent tendency to shrink after being formed by casting or by molding under heat and pressure.

SUMMARY OF THE INVENTION

According to the present invention, lenticular sheets for use in integral photography comprising a large number of closely adjacent or contiguous lenslets, closely packed in either a square, or preferably a hexagonal array, are formed of a transparent moldable or castable plastic material. Such lenticular sheets are cast or molded under heat and pressure and are almost always subject to shrinkage thereby destroying the essential register between the images recorded by the lenslets of the sheet and subsequent lenslet sheets used to copy or to view the images or their copy. Some form of diaphragm apertures are needed for the lenticular sheet to reduce spherical aberration so as to improve the quality of the images formed by the lenslets, and it is important that the images originally recorded on the photographic layer with field-limiting apertures prevent the image formed by one lenslet from intruding upon the image formed by any one of the adjacent lenslets. Similarly in some forms of lenticular sheets to be used in the viewing of an integral photograph, the provision of a field-limiting aperture sheet helps to prevent the formation of secondary images or phases as the observer perceives the image formed by one lenslet through adjacent lenslets.

The diaphragm sheet of the present invention comprises a very thin apertured metal layer having accurately spaced small uniform apertures bonded to a thicker metal sheet, the thicker sheet being provided with a series of substantially registering larger apertures, large enough not to obstruct any light beam from the smaller aperture, the small and larger apertures being substantially coaxial with each other, the apertures in the thin layer being adapted to be coaxially registered with the lenslets of the lenticular sheet with which the diaphragm sheet is to be used, and in which it is usually embedded.

The structure of the field limiting aperture sheet of the present invention is similar to that of the diaphragm sheet except that the apertures in this sheet are much larger than those in the diaphragm sheet and are preferably hexagonal.

THE DRAWINGS

Of the drawings:

FIG. 1A is a greatly enlarged, fragmentary schematic representation of a photographic negative for use in the present invention for producing diaphragm sheets;

FIG. 1B is a similar view of another negative on the same scale and showing a non-marginal portion of the negative;

FIG. 2 is a greatly enlarged, fragmentary schematic representation of a third photographic negative useful for producing field limiting aperture sheets;

DESCRIPTION OF THE PREFERRED EMBODIMENTS

Figure 3:
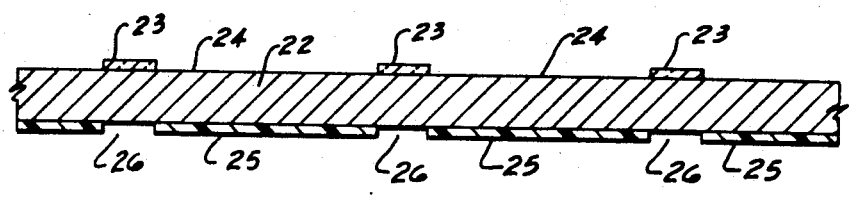
FIGS. 3 and 4 are schematic cross-sectional views of early steps in the process of preparing an apertured sheet in accordance with the invention.

Referring now in detail to the present preferred and illustrative embodiments of the invention and the process by which the invention may be accomplished:

A photographic plate or stable base film 10 is prepared having a sufficiently large area to cover the area of the final lenticular sheet. This photographic member 10 comprises a transparent base member on which is an image layer having uniformly spaced small opaque dots 12 which are preferably arranged in a hexagonal array, and are separated from each other by transparent areas 14. Dots 12 are conveniently spaced about 3/32 inch from each other and may be each about 0.020 inch in diameter, although both of these dimensions may be much greater or much smaller, and the diameter of the dots 12 to be used to produce diaphragm apertures is preferably only a small fraction of the spacing between the dots.

A second complementary photographic plate or film (not shown) is also prepared, preferably by contact printing from the member 10, and being the negative or reverse of the member 10. Thus, the dots are clear and the areas 14 between them are opaque.

Adjacent one or more edges 11 of the plate 10 are provided at least two register marks 13, (only one of which is shown, while the other is at a considerable distance therefrom) which are formed photographically in the emulsion of the plate 10.

As shown in FIG. 1B, the dots 12' are considerably larger, but the spacing between them is the same as in FIG. 1A, when the plates are used in conjunction with each other.

In a different photographic plate or film 16, shown in FIG. 2, intended for producing field limiting aperture sheets the uniformly spaced opaque dots 18 are somewhat larger than the dots 12, but on the same spacing and are surrounded by the clear areas 20. The opaque dots 18 are hexagonal in form, in this embodiment.

A complementary photographic plate or film (not shown) is prepared by contact printing from the member 16 to register face to face with the plate of FIG. 2, where the dots are clear and the areas between them are opaque.

In each instance, the plates of FIGS. 1A, 1B and 2 are provided with at least two spaced register marks adjacent to one or more edges thereof, as described for plate 10 and to be used as explained below.

A flat sheet of metal 22 of uniform thickness is coated on both sides with conventional layers 23, 25 of photosensitive Resist, such as bichromated gelatin or shellac or more preferably Eastman Kodak "KPR" resist which is a cinnaminic acid ester of polyvinyl alcohol.

After the resist layers 23, 25 have been dried, the photographic member 10 and its complement are placed against opposite sides of the metal sheet 22 with the dots on each in coaxial register, and the resist layers 23 and 25 are exposed to harden their illuminated areas.

When fully exposed, the resist layers 23 and 25 are appropriately developed to provide hardened resist areas 23 and 25 on the two sides of the metal plate 22 and intervening bare metal areas 24 and 26, the areas being in coaxial register.

The metal sheet 22 is preferably made of copper and is adapted to be plated with a thin electrolytically deposited layer of nickel. However, other combinations of metals may be used provided the base layer may be plated with a second metal without the base layer 22 being impaired, and also provided that the base layer may be differentially etched without the electrolytically deposited layer being destroyed. It is preferred to use copper for the sheet 22 and to deposit on it a thin layer of electrolytic nickel, after which exposed areas of the copper sheet may be etched using an aqueous solution of ammonium persulfate which does not substantially affect the thin electrodeposited layer of nickel adherent thereon.

Other combinations of metals may be used and the metal sheet 22 might be of aluminum with an overlying electrodeposited layer of chromium, the mordant being a dilute aqueous solution of sodium hydroxide.

The developed resist layers 23 and 25 on the base metal sheet 22 are shown in FIG. 3.

The face of the sheet 22 to be provided with the larger apertures (the underside in FIG. 4) is temporarily protected as by a coating of asphaltum (not shown), after which the sheet 22 is subjected to an electroplating operation to deposit a layer of metal, such as nickel, in the areas 27 surrounding the resist dots 23. Plating is continued until the nickel layer is sufficiently thick, usually about 0.001 inch. Other conventional electroplating or electroless processes for nickel-plating are suitable.

Figure 4:
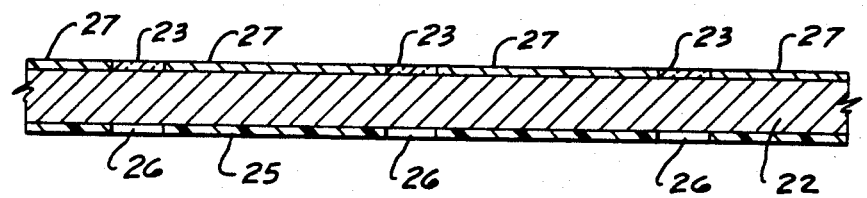
Figure 5:
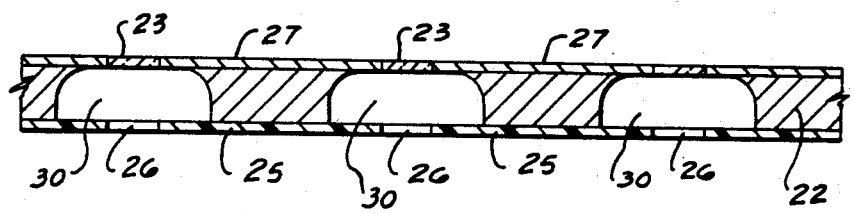
FIG. 5 is a similar view of a later step in the process.

After completion of the nickel-plating step, the asphaltum layer on the other side of metal sheet 22 is removed by an appropriate organic solvent, such as benzene, producing the sheet of FIG. 4.

The plate is then washed and subjected to etching with an aqueous solution of ammonium persulfate, usually from 40° to 42° Baume. Preferably the etching is accomplished by the "powderless" etching process in which the plate 22 is positioned with its resist layer 25 forming the underside against which a forceful spray of the ammonium persulfate solution is directed.

Figure 6:
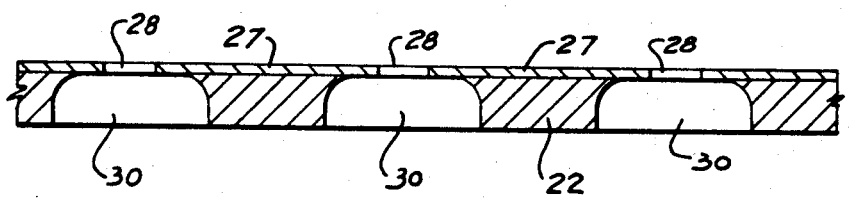
FIG. 6 is a schematic cross-sectional view of a finished apertured sheet according to the present invention.

Etching is continued until the areas 30 adjacent the unprotected dot areas 26 have been substantially "undercut" so that the etched away areas 30 are considerably larger than the dots 26 and substantially coaxial therewith. Thereafter, the remaining resist areas 23 and 25 on both sides of sheet 22 are removed to form the apertured diaphragm sheet shown in section in FIG. 6, usually by means of trichloroethylene.

Of course, the diameter of the apertures 28 and 30 may be varied, as well as their spacing depending upon the exact use to which the apertured plate will be put. Preferably, at least one face of the sheet 22 is blackened, as by a flash coating of black nickel.

At the same time as apertures 28 and 30 are being produced in the sheet 22, register holes are formed corresponding to the dots 13 of plate 10, which register holes serve accurately to locate the apertured metal sheet 22 by register pins which also cooperate with corresponding register holes in the mold members 40 and 42, as will be later described.

Figure 7:
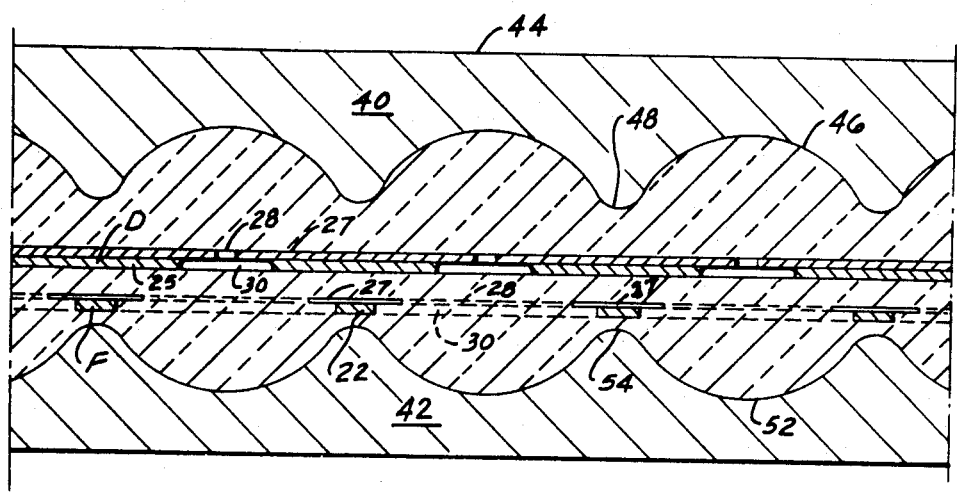
FIG. 7 is a schematic cross-sectional view of the molding of a lenticular sheet in which an apertured metal reinforcing sheet is embedded, according to the invention.

FIG. 7 schematically illustrates the molding of a lenticular sheet according to the present invention which sheet has a diaphragm aperture sheet and a field limiting aperture sheet, embedded in a molded body of transparent thermosetting resin, the apertured sheets serving to reinforce the plastic sheet as well as to provide it with diaphragm and field limiting apertures each coaxial with each other, and the diaphragm sheet concentric with the corresponding lenslet of the lenticular sheet. Upper and lower mold members 40 and 42 are provided to register with each other. The upper member 40 comprises a metal member having a flat back surface 44 on the opposite side of which are partispherical concavities 46 arranged in a closely packed hexagonal array.

The lower mold member 42 comprises a member having a flat back 50 and on its upper side is provided with partispherical concavities 52 arranged in a closely packed hexagonal array and in coaxial register with the concavities 46 in the upper mold member 40.

The concavities 46 are preferably identical in shape and size, as are the concavities 52, although the concavities 46 and 52 may differ from each other in both curvature and size. Likewise, the concavities 46 and 52 may be spaced from each other, as shown, to form parts of the same spheres, or may be differently spaced, depending upon the index of refraction of the transparent plastic to be cast in the molds.

As shown in FIG. 7, the two apertured sheets prepared in accordance with the description of FIGS. 1 to 7 are supported between the mold member 40 and 42. Where the lenticular sheet is to be used for taking an integral photograph of a scene, it is preferable to provide a diaphragm aperture sheet D with the diaphragm apertures 32 coaxial with the respective lenslets and at the principal points of the lenslets. The peripheral edges of the apertures 30 are outside of the acceptance angle of the system.

For control of the field, one or more field limiting aperture sheets F may be provided, properly spaced from sheet D.

The sheets D and F are usually placed in accurate position in the lenticular sheet by register pins corresponding to the register holes produced as described above, and by successively casting the lenses of one side of the sheet as a relatively thin plano-convex member, using a thick flat glass plate as mold member for the plano side; then casting one of the metal sheets over the plano side between two very thin transparent layers of resin of the order of .001 inch. Then, if needed, casting an additional spacing resin layer, then casting the next metal sheet like the first metal sheet, i.e., between two very thin layers of resin, and finally casting the lenses of the other side against this multilayer cast, as a plano-convex member, using for this a cavity similar to the first cavity, care being taken that each layer be held in close register with all the other layers.

The material used for casting may be, for example, a transparent thermosetting resin such as a polyester resin.

The apertured metal sheets have been prepared from negatives 10 or 20 each of which includes within its marginal portions at least two widely spaced register indices 13 bearing a uniform spatial relation to the dots 12, 12' or 18. The mold members 40 and 42 are derived from the same master as was used to locate and produce the register indices 13. They therefore have spaced register indices having an identical relation to the axes of the several concavities 46, 52 which serve to form the lenslet elements of the eventual lenticular sheet.

Thus, using accurately formed holes corresponding to the register indices 13, with similar holes in the mold members 40 and 42 the sheets D and F and the mold members may all be accurately registered with each other so that the apertures in sheets D and F are accurately registered with the lenslets formed by the cavities in the mold members 40 and 42, using fixed register pins to hold the several layers against lateral movement relative to each other.

The mold members 40 and 42 are used for the casting operation and, during the curing or setting period, the mold members are pressed together in order to keep the plastic resin under pressure as it sets and, therefore, to "follow" the plastic as it contracts transversely, thereby avoiding vermiculation and other shrinkage deformations usually called "shrink marks." During the setting process, lateral shrinkage of the resin is reduced and substantially eliminated by the cavities in the mold members as well as by the apertured members D and F which act as reinforcing members embedded in the resin.

Figure 8:
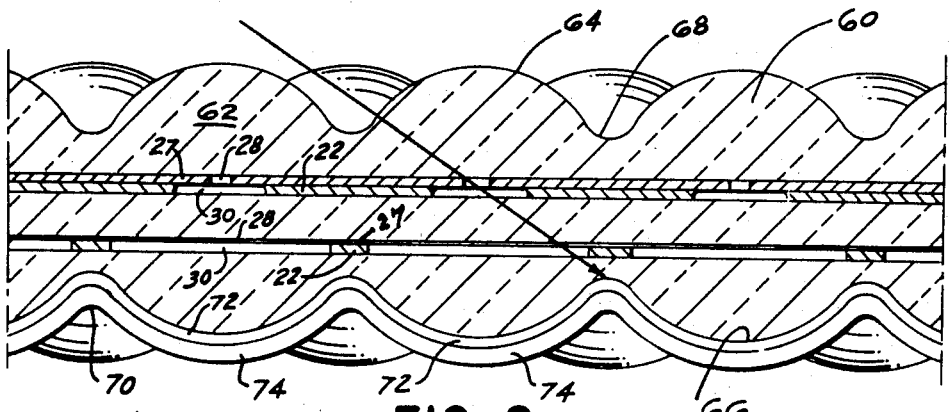
FIG. 8 is a similar view showing the formation of a different lenticular sheet with a plurality of apertured reinforcing sheets and as used with associated embossed sensitive film.

FIG. 8 illustrates, in schematic section, a lenticular sheet according to the present invention especially dimensioned for the taking of integral photographs, and includes a sheet of embossed radiation sensitive film, such as Ektacolor negative color film.

As shown, the lenticular sheet 60 comprises a large number of lenslets 62 having spherical upper and lower surfaces 64 and 66 arranged in a closely packed hexagonal array.

On the object side of the lenslets 62, they are connected together by concave areas of plastic resin 68 integral with the plastic resin of the lenslets 62. On the image side of the lenticular sheet 60, may be fitted the embossed surface of a sheet of radiation sensitive film, such as a sheet of Ektacolor embossed to conform closely to the array of lenslets 66 with their interstices 70. As shown, the embossed film has its emulsion layers 72 in registering contact with the face of the lenslets and supported by the film base 74. The slight size difference between the film and the lenticular sheet is compensated for by slight warpage of the interstices of the film.

Specifically different lenticular sheets of different focal length, lenslet diameter and spacing and with square instead of hexagonal packing may be produced by the method of the present invention.

In a preferred practical form, the spherical lenslets 62 have a diameter of 0.090 inch and the diaphragm aperture is about 0.015 inch and the acceptance angle, as limited by the field limiting apertures, is approximately 110°; although this will vary depending on the index of refraction of the plastic resin which will dictate the thickness of the screen relative to the lenslet's radius of curvature; the higher the index the greater the possible maximum acceptance angle.

Figure 9:
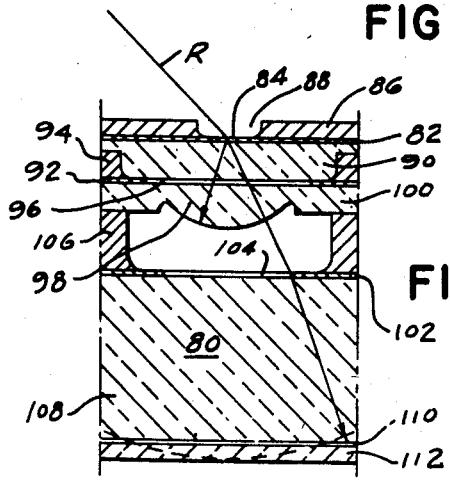
FIG. 9 shows in section another form of lenslet forming part of a lenticular sheet.

FIG. 9 illustrates, in cross section, a somewhat different form of lenslet in a lenticular sheet produced in accordance with the present invention. As shown, the figure illustrates a single lenslet 80, it being understood that it is completely surrounded by identical, contiguous lenslets, in a square or preferably a hexagonal array. Uppermost, on the side facing the copy to be reproduced and away from the photographic film, is a reinforced apertured diaphragm layer comprising a thin nickel sheet 82, provided with a small diaphragm aperture 84 bonded to a thicker copper layer 86 having an aperture 88 much larger than the diaphragm aperture 84. The layers 82 and 86 do not terminate at the edge of a lenslet but extend across the entire area of the lenticular sheet. The aperture 84 is centered on the lenslet 80 and lies at the principal point of the lenslet.

Preferably cemented to the back of the nickel sheet 82 is a reinforced layer 90 of a transparent plastic resin, having parallel flat faces, and preferably formed of a polyester resin. Embedded in the layer 90 is a reinforcing layer extending over the entire area of the lenticular sheet. This reinforcing layer also comprises a thin nickel layer 92 and a thick copper layer 94 having a large central aperture 96, which is sufficiently large as to not obscure any of the light passing through the diaphragm aperture 84.

Adhering on the back of the nickel sheet 92 is a sheet having uniform, evenly spaced lenslets 98, coaxial with the apertures 84, preferably formed of a thermoset, transparent resin preferably of the same refractive index as layer 90, to focus the image on the emulsion of the photographic film. Each lenslet 98 is surrounded by an integral web 100 of plastic by which the lenslets are interconnected into a sheet.

Beneath the lenslets 98 and preferably cemented to their interconnecting web portions 100 is a heavily reinforced field limiting apertured sheet, which comprises a thin nickel sheet 102 having an aperture 104 for each lenslet, each aperture being coaxial with its lenslet 98. The nickel sheet 102 is bonded to a much thicker apertured copper sheet 106, the apertures in the copper sheet being much larger than the aperture 102 so that there is no interference with the rays passing through aperture 84 and focused by lenslet 98. The space between the lenslet 98 and the apertured nickel sheet 102 is preferably an air filled space.

The lenslet structure described above is illustratively mounted on, and/or cemented to a relatively thick layer 108 of glass or transparent plastic having parallel faces. On the rear face of the transparent layer 108 is positioned the photographic film comprising the radiation sensitive layer 110 and the film base 112. The thickness of the layer 108 is such that the parallel rays R passing through aperture 84 are substantially focused on the sensitive layer 110. In FIG. 9, a dotted line intersecting the sensitive layer 110 and film base 112 shows the theoretical focus of the rays, but due to the small diameter of the aperture 84, the entire image is sufficiently sharp for practical purposes on the flat plane of this film emulsion.

The dimensions of the field-limiting apertures 104 are preferably such that the image formed by one lenslet 98 extends to the edge of the film area for that lenslet and does not overlap onto the area for the adjacent lenslet. To give the greatest possible image coverage, when the lenslets 98 are in hexagonal array, the apertures 104 are also hexagonal insuring that the image formed by one lenslet 98 is substantially contiguous with the surrounding images formed by the contiguous lenslets.

The invention in its broader aspects is not limited to the specific steps, processes and instrumentalities shown and described but departures may be made therefrom within the scope of the accompanying claims without departing from the principles of the invention and without sacrificing its chief advantages.

What is claimed is:

1. A transparent plastic resin lenticular assembly for use in integral photography comprising a plurality of closely packed positive lenslets of substantially equal focal length, forming a sheet-like structure, a first metal diaphragm sheet embedded in the plastic resin having apertures therein lying substantially in the plane of the principal points of the lenslets, said apertures being of equal area and each being concentric with its associated lenslet, a second metal sheet having fully embedded in said resin larger apertures each coaxial with an aperture in the first metal sheet spaced from the first metal sheet, the edges of said larger apertures serving as field limiting masks.

2. A transparent plastic resin lenticular assembly for use in integral photography comprising a plurality of closely packed positive lenslets of substantially equal focal length, forming a sheet-like structure, three metal sheets each having a plurality of apertures which are each concentric with one of the associated lenslets so that the apertures in all three metal sheets are coaxial with each other, a first of the metal sheets lying substantially in the plane of the principal points of the lenslets, a second of the sheets having larger apertures than the apertures in the first sheet, the edges of said larger apertures serving as field limiting masks, and the third apertured metal sheet being positioned between the first and second metal sheets.

3. A transparent plastic resin lenticular assembly for use in integral photography comprising a plurality of closely packed positive lenslets of substantially equal focal length, forming a sheet-like structure, a first metal diaphragm sheet having apertures therein lying substantially in the plane of the principal points of the lenslets, said apertures being of equal area and each being concentric with its associated lenslet, a second metal sheet having larger apertures each coaxial with an aperture in the first metal sheet spaced from said first metal sheet, the edges of said larger apertures serving as field limiting masks, some of the apertured metal sheets being bonded to a thicker aperture metal sheet, and some of the apertured metal sheets being embedded in the plastic resin lenticular sheets and having their apertures coaxial with the lenslets of said lenticular sheet.

* * * * *